United States Patent [19]

Mayer et al.

[11] 4,012,281
[45] Mar. 15, 1977

[54] WET LAID LAMINATE AND METHOD OF MANUFACTURING THE SAME

[75] Inventors: Warren C. Mayer, Somverville; Donald V. Skistimas, Milltown, both of N.J.

[73] Assignee: Johnson & Johnson, New Brunswick, N.J.

[22] Filed: Mar. 4, 1975

[21] Appl. No.: 555,230

[52] U.S. Cl. .............................. 162/127; 162/130; 162/135; 162/146; 162/149; 162/184; 428/198; 428/303

[51] Int. Cl.² ..................... D21F 11/00; B32B 7/14

[58] Field of Search .......... 162/125, 130, 146, 184, 162/127, 186, 135, 149; 428/198, 302, 303; 427/288; 156/62.2

[56] References Cited

UNITED STATES PATENTS 3,778,341   12/1973   Plummer et al. .................. 162/125

*Primary Examiner*—S. Leon Bashore
*Assistant Examiner*—Peter Chin

[57] ABSTRACT

An improved wet laid laminate comprising a first layer consisting of very short fibrous material and a binder and a second layer consisting of a combination of very short fibrous material and rayon or synthetic fibrous material substantially free of binder material and methods for manufacturing the improved laminates.

14 Claims, 4 Drawing Figures

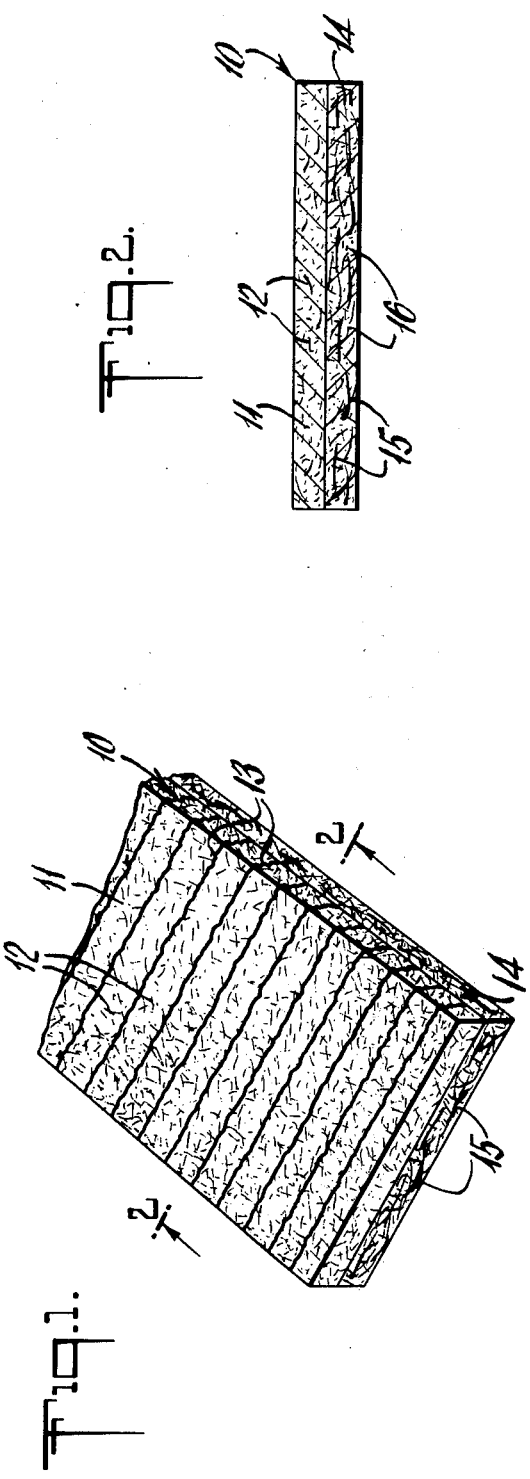
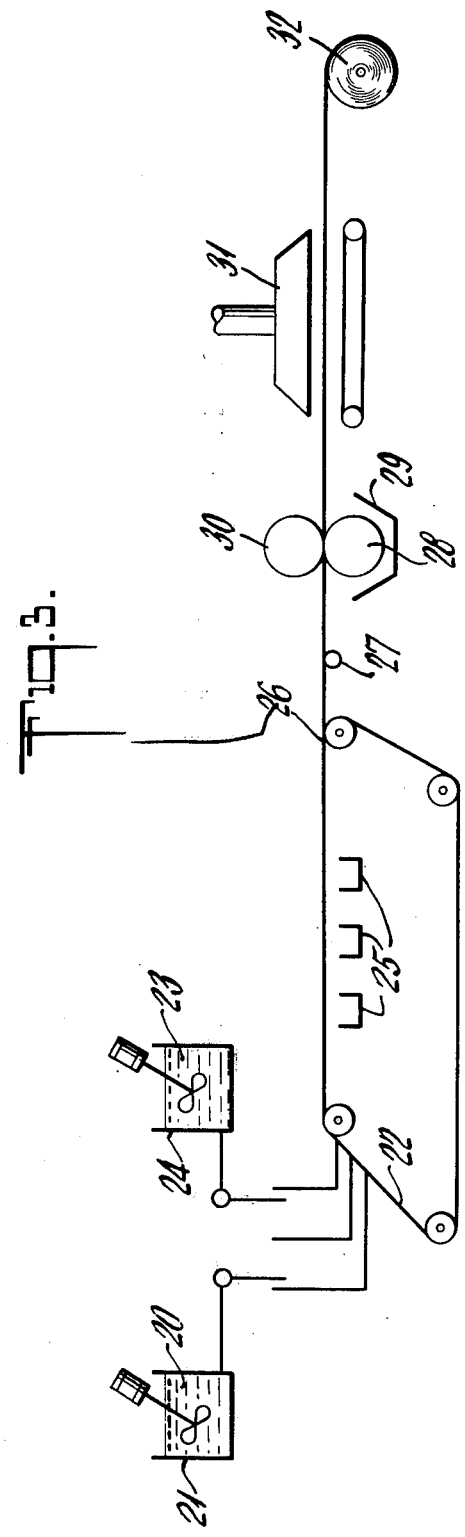

WET LAID LAMINATE AND METHOD OF MANUFACTURING THE SAME

The present invention relates to improved wet laid laminates and methods for manufacturing the same.

BACKGROUND OF THE INVENTION

Two important methods for producing nonwoven fabrics are the wet laid process and the dry laid process. Both of these methods have their advantages, for example, generally the wet laid process runs at faster speeds, uses cheaper raw materials and is more economical. On the other hand, the dry laid process generally produces a bulkier, more absorbent and softer product. The wet laid process uses a short fiber such as wood pulp fiber which is carried in water, placed on a paper-making type machine and the water removed. The removal of the water from the wood pulp fiber may cause what is termed "hydration bonding" to some degree and produces a stiffer, more paper-like product. The use of water in the process reduces the bulk or the thickness of the product being produced. The wet laid process may be modified by the use of various types of fibers in combinations and the addition of various binder or filler materials.

The dry laid process does not use water and produces a bulkier product. Generally longer fibers are used, the speeds are lower and the dry laid process is usually a more expensive process than the wet laid process.

In recent years a number of techniques have been developed for the dry formation of fabrics from wood pulp fibers which can be run at high speeds. These dry processes overcome some of the disadvantages of the prior dry processes in that more economical raw materials can be used and bulk can still be obtained in the product as water is not used. The dry pulp forming processes, however, unless considerable amounts of binder are used, generally produce weak, but highly absorbent materials. These materials are usually laminated to other materials, but because of their lack of strength may be difficult to handle and convert, that is, cut in shapes, folded, etc.

SUMMARY OF THE PRESENT INVENTION

We have developed new improved wet laid products which have high absorbency and bulk, are readily handled in subsequent conversion processes and have excellent abrasion resistance. Our new process for making these products utilizes inexpensive raw materials and can be operated at high speeds yet produce products which have good absorbency and capacity while maintaining many of the desirable properties attributable to the wet laid processes.

In accordance with the present invention, our improved wet laid fibrous laminate comprises a first layer having a bulk density of from 0.2 to 2.0 cubic centimeters per gram. This first layer consists of fibers having a length of from one to three millimeters and an adhesive binder distributed in a pattern throughout the fibrous material. The layer has excellent wet abrasion resistance and good dry abrasion resistance. The second layer of the laminate consists of from 0 percent to 60 percent of wood pulp fibers and from 100 percent to 40 percent of textile fibers having a length of from ⅛ inch to 1 inch and selected from the class consisting of artificial fibers, synthetic fibers or combinations thereof. The second layer is substantially free of binder material and has excellent absorbent rate and capacity. The second layer has a bulk density of from 6 to 10 cubic centimeters per gram.

The two layers are held together in the laminate by a combination of frictional entanglement of the fibrous material and migration of the binder material from the first layer to the adjacent surface of the second layer. The laminate has a bulk density of from 4 to 8 cubic centimeters per gram.

Our improved laminate is produced by depositing from an aqueous dispersion onto a permeable support member a layer of wood pulp fibers having a length of from 1 to 3 millimeters. On top of this layer another layer of artificial and/or synthetic fibers having a length of from ⅛ inch to 1 inch and wood pulp fibers is deposited from an aqueous dispersion. The layers are allowed to drain and water removed and a resin binder material is printed onto the all wood pulp fiber layer in a desired pattern. The laminate is dried to remove the water and produce a wet laid laminate having a bulk density of from 4 to 8 cubic centimeters per gram.

BRIEF DESCRIPTION OF THE DRAWINGS

The invention will be more fully described in conjunction with the accompanying drawings wherein:

FIG. 1 is a view in perspective of the improved wet laid laminate according to the present invention, FIG. 2 is a cross-sectional view of the fabric depicted in FIG. 1 taken along line 2—2, FIG. 3 is a schematic drawing of apparatus for carrying out the method of the present invention.

DETAILED DESCRIPTION OF THE DRAWINGS

Figure 4:
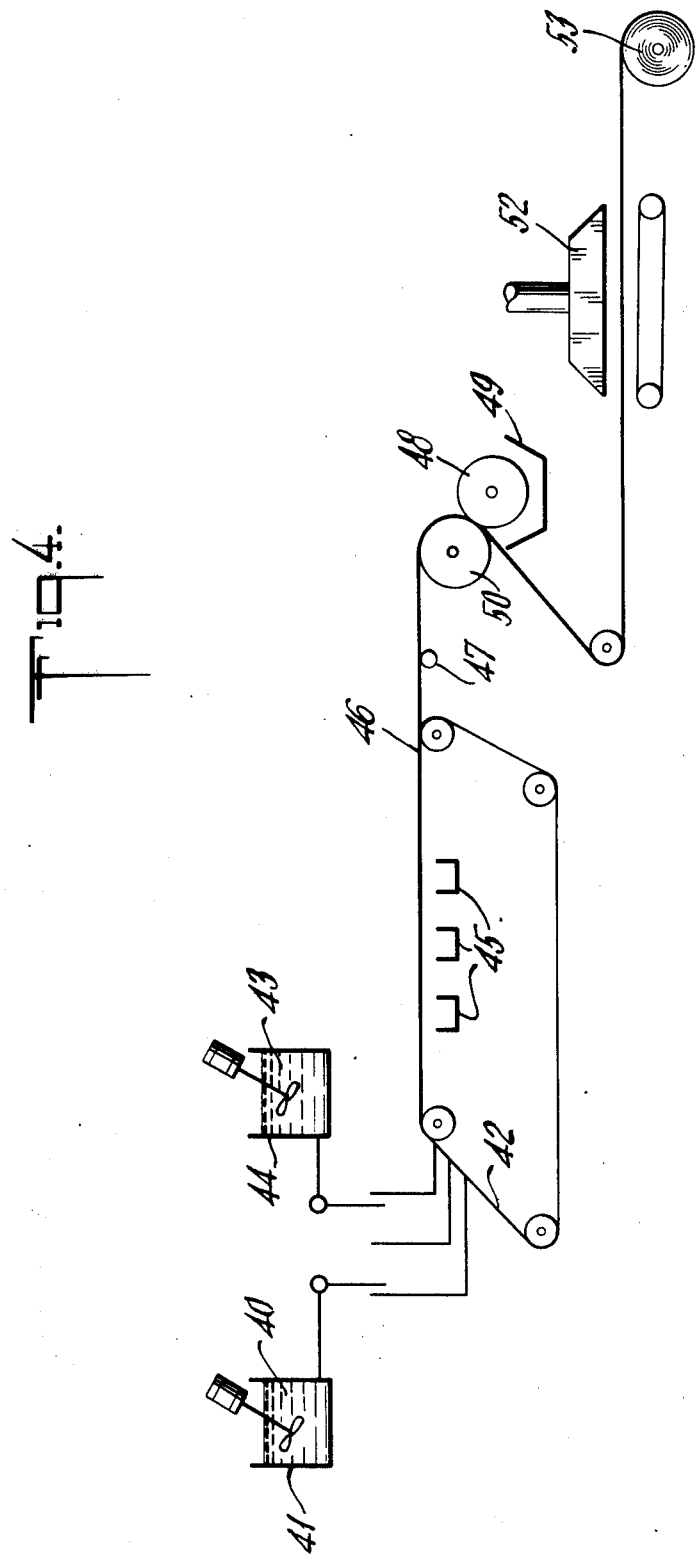
FIG. 4 is a schematic drawing of another form of apparatus for carrying out the method of the present invention.

Referring to the drawings in FIGS. 1 and 2, there is shown the improved wet laid laminate 10 of the present invention. The top layer 11 consists of short fibrous material 12 and a resin binder 13. The fibrous material has a length of from one to three millimeters and suitable fibers are standard wood pulp fibers. Distributed throughout this layer in an intermittent wavy line pattern is a resin binder to hold the fibers together. The bottom or second layer 14 is all fibrous material and comprises a portion which is wood pulp fibers 15 and a portion which is artificial or synthetic fibers 16. The layers are held together by a combination of the entanglement between the artificial or synthetic fibers of the second layer with the fibrous material in the first layer along with some adhesive bonding between the surfaces of the two layers.

As previously mentioned, the fibers in the first or upper layer have a length of from one to three millimeters. Examples of fibers which may be used are standard wood pulp fibers made from hardwood or softwood, hemp, or the synthetic wood pulps made from the polyolefins or similar materials. The binder used to hold these fibers together may be any of the standard binders used in the manufacture of wet laid fabrics. For example, the vinyl chlorides, the vinyl acetates, the acrylics and the like may be used. The binder is applied to the fibrous layer in an intermittent print pattern. Patterns of diagonal or horizontal wavy or straight lines, dots, ovals, squares or other configurations may be used. This layer should contain from about 25 grains per square yard to 200 grains per square yard of wood pulp fiber and from about 50 to 400 grains per square yard of binder material. The higher the ratio of binder to fiber the more the binder will tend to pass through the first fiber layer and penetrate into the second or lower fiber layer.

The first layer should have a bulk density of from 0.2 to 2 cubic centimeters per gram. A density within this range is important to provide the layer with good abrasion resistance in both the dry and the wet state and also allow the layer to be readily penetrated with water so that the lower layers may absorb the water. This penetration may be helped or improved by adding standard wet out materials to the binder when it is applied. It is also believed that the density is important in order that the final laminate may be readily handled and cut and converted in subsequent operations. If the density of the layer is higher than the desired range, though the layer may still be handled, it will not be penetrated by water and not have the desired absorbency characteristics. If the density is lower than the above range, the material loses its handleability and abrasion resistance.

The second or bottom layer contains a combination of wood pulp fibers and textile fibers and should weigh from about 200 to 800 grains per square yard. The second layer consists of from 0 percent to 60 percent of wood pulp fibers and the fibers have a length of from 1 millimeter to 3 millimeters. The remainder of this layer is a short artificial or synthetic textile fiber such as rayon fibers, cellulose acetate fibers, polyester fibers and the like. This layer provides the absorbency and the bulk desired for many end uses and not normally found in wet laid products. It is believed the bulk is enhanced by the use of the textile fiber which maintan sufficient distances between the wood pulp fibers and thereby maintains the absorbent capacity. Also the textile fibers improve the adherence of the layer to the resin binder of the upper layer so that the entire laminate is readily handleable.

If all wood pulp fibers are used in this second layer, it will be boardy and lose its bulk because of hydration bonding and densification, whereas if all textile fibers are used, the cost is increased. In some instances for specific end uses it may be desirable to add a small percentage of longer and higher denier textile fibers to the second layer to obtain increased bulk and strength.

The above described limited combination of a layer of wood pulp fiber and binder and a layer containing 1 to 3 millimeter textile fiber produces a laminate which is readily handleable, has good abrasion resistance and unexpectedly has improved bulk and good absorbency characteristics.

The laminate may be used by itself as an absorbent dressing or in combination with other materials such as plastic films, tissues or other fabrics in the manufacture of drapes and gowns or other absorbent products.

In FIG. 3 there is a schematic showing of apparatus for carrying out the process of the present invention for manufacturing our improved wet laid laminate. An aqueous slurry 20 of wood pulp fibers having a length of from about 1 to 3 millimeters is made up in a suitable tank 21 and deposited on the wire screen 22 of a paper-making machine. A second aqueous slurry 23 of wood pulp and textile fiber is made up in a second tank 24 and deposited on the screen on top of the first slurry. The excess water is allowed to drain through the screen into appropriate collectors 25 as the fibers are conveyed by the screen. When sufficient water is removed, the laminate 26 is removed from the screen by the roll 27 and passed through a print roll mechanism. The print roll mechanism comprises a pair of rolls. The bottom roll 28 has an engraved pattern on it and rotates in a pan 29 containing the desired binder material. The engraved roll rotates against a back up roll 30. The laminate passes between the two rolls and the binder is picked up in the print pattern of the bottom roll and deposited onto the wood pulp fiber side of the laminate. The laminate with the binder thereon passes through an oven 31 to remove the remaining water and dry and cure the binder material. The laminate is wound up on a standard wind-up mechanism 32.

Because of the nature of the different types of fibers used in the different layers of the products of the present invention, a preferred method for manufacturing the product of the present invention is shown in FIG. 4. An aqueous slurry 40 of wood pulp and textile fibers is made up in a suitable tank 41 and deposited on the wire screen 42 of a paper making machine. A second aqueous slurry 43 of wood pulp fibers having a length of 1 to 3 millimeters is made up in a second tank 44 and deposited on the screen on top of the first slurry. By depositing the textile fibers first, they tend to lay straight and free ends do not stick through the all wood pulp fiber layer and reduce the desirable abrasion resistance properties of the all wood pulp layer. Also the textile fiber layer acts as a filter and helps prevent the shorter wood pulp fibers of the second layer from passing through the openings of the wire screen.

The excess water from the layers is allowed to drain through the screen into appropriate collectors 45 as the fibers are conveyed by the screen. When sufficient water is removed, the laminate 46 is removed from the screen by the roll 47 and passed through a print roll mechanism as shown. Roll 48 is engraved and rotates in the binder pan 49. The roll picks up binder from the pan and prints it in the engraved pattern on the all wood pulp layer as the laminate passes around the back-up roll 50. The printed laminate passes around the redirecting roll 51 and through the oven 52 to a standard wind up mechanism 53.

The preparation of fabrics according to the present invention is further illustrated by the following examples. The examples are given for the purpose of illustration only and the invention is not limited thereto.

EXAMPLE I

A wet laid laminate is prepared as follows: a first layer of 25 percent high alpha, hardwood, sulfite, wood pulp and 75 percent ¼ inch, 1½ denier, bright rayon riber is deposited on the wire of a paper making machine. A second layer of 100 percent high alpha, hardwood, sulfite, wood pulp is deposited on top of the first layer. The fibers from both layers are slurried separately to about a 1 percent consistency in a stock chest and deposited on the wire as described. The first layer contains about 150 grains per square yard of wood pulp fiber and about 450 grains per square yard of rayon fiber. The second or all wood pulp layer contains about 125 grains per square yard of wood pulp fiber. Water is allowed to drain from the laminate and the laminate removed from the wire. The all wood pulp side of the laminate is print bonded. The binder used is a self cross linking acrylic emulsion to which a hydrox ethyl cellulose thickener has been added to control the viscosity of the emulsion. The binder is applied in a print pattern of 23 lines per inch with the lines running 15° to the transverse direction of the fabric and with the lines approximately 0.018 inch wide. About 130 grains per square yard of binder is applied to the all wood pulp layer. The laminate with the binder thereon is dried by passing the laminate over heated drying cylinders at a temperature of about 250° F. The total weight of the dried laminate is about 855 grains per square yard. The dry laminate has a bulk density of about 6 cubic centimeters per gram. The resultant laminate is very uniform and easily handleable. The bonded surface has excellent abrasion resistance in both the dry and wet states. Water readily penetrates through the bonded surface and is readily absorbed in considerable capacity by the laminate. The fabric is suitable for use in disposable end uses where absorbency, softness, abrasion resistance and economics are important.

EXAMPLE II

The procedure of Example I is followed substantially as set forth therein with the exception that 1.5 denier polyester fibers having a length of ¼ inch are substituted for the rayon fibers in the first layer. The results are comparable to those of Example I.

EXAMPLE III

A wet laid laminate is prepared as follows: A first layer of 100 percent Douglas fir wood pulp is deposited on a permeable wire of a paper-making type machine. A second layer of 65 percent ¼ inch, 1½ denier, polyester fibers and 35 percent of Douglas fir wood pulp is deposited on top of the first layer. The all wood pulp layer contains about 100 grains per square yard of wood pulp fiber and the second layer contains about 550 grains of wood pulp and polyester fibers. The all wood pulp side of the laminate is print bonded in a pattern of dots using a copolymer of vinyl acetate and vinyl chloride. About 180 grains per square yard of binder is applied. The laminate is dried and the dry laminate has a bulk density of about 7 cubic centimeters per gram. The dry laminate has good abrasion resistance, absorbency and bulk.

EXAMPLE IV

The procedure of Example III is followed substantially as set forth therein with the exception that 1.8 denier, ¼ inch cellulose acetate fibers are substituted for the polyester fibers. Comparable results are obtained.

EXAMPLE V

The procedure of Example I is followed substantially as set forth therein with the exception that a synthetic wood pulp is substituted for the hardwood sulfite wood pulp in the first layer. The synthetic wood pulp is a water-dispersible, thermoplastic material having a shape and size distribution similar to conventional natural wood pulps.

Although the present invention has been described in particularity in the presented examples by reference to specific materials, it is to be appreciated that such is merely illustrative of the present invention and is not to be construed as limitative thereof except as defined by the appended claims.

What is claimed is:

1. An improved wet laid fibrous laminate comprising a first layer consisting of fibrous material having a length of from 1 millimeter to 3 millimeters and an adhesive binder distributed in a print pattern throughout the layer whereby the layer has excellent wet and dry abrasion resistance and a second layer consisting of less than 60 percent of wood pulp fibers and from 40 percent to 100 percent of synthetic textile fiber having a length of ⅛ inch to 1 inch, said second layer being substantially free of binder material and being adhered to the first layer through the frictional entanglement of the textile fiber with the first layer and by the adhesive binder to provide an easily handleable absorbent laminate, said laminate having a bulk density of from 4 to 8 cubic centimeters per gram.

2. An improved laminate according to claim 1 wherein the fibrous material in the first layer is wood pulp.

3. An improved laminate according to claim 1 wherein the first layer has a bulk density of from 0.2 to 2 cubic centimeters per gram.

4. An improved laminate according to claim 1 wherein the first layer contains from 25 to 200 grains per square yard of fibrous material and the laminate contains from 50 to 400 grains per square yard of an adhesive binder.

5. An improved laminate according to claim 1 wherein the textile fibers in the second layer are rayon fibers.

6. An improved laminate according to claim 1 wherein the textile fibers in the second layer are polyester fibers.

7. An improved laminate according to claim 1 wherein the second layer weighs from 200 to 800 grains per square yard.

8. An improved laminate according to claim 1 wherein the fibrous material of the first layer is wood pulp and the textile fibers in the second layer are rayon fibers.

9. An improved laminate according to claim 1 wherein the fibrous material of the first layer is wood pulp and the textile fibers in the second layer are polyester fibers.

10. An improved laminate according to claim 1 wherein the first layer contains from 25 to 200 grains per square yard of fibrous material and from 50 to 400 grains per square yard of an adhesive binder and the second layer weighs from about 200 to 800 grains per square yard.

11. An improved laminate according to claim 10 wherein the fibrous material in the first layer is wood pulp and the textile fibers in the second layer are rayon fibers.

12. An improved laminate according to claim 10 wherein the fibrous material in the first material is wood pulp and the textile fibers in the second layer are polyester fibers.

13. A method of manufacturing a wet laid fibrous laminate comprising depositing a first aqueous slurry of wood pulp fibers and synthetic textile fibers on a permeable screen to form a first layer consisting of less than 60% wood pulp fibers and from 60–100% synthetic textile fibers, depositing a second aqueous slurry of shot fibers consisting of short fibers having a length of from one to three millimeters on top of the first fibrous layer, removing a portion of the water from said fibrous layers to form a laminate, removing the laminate from the wire screen, applying an adhesive binder to the fibrous layer containing the fibers having a length of from one to three millimeters in an intermittent print pattern wherein the first layer remains substantially free of binder, drying the laminate with the adhesive binder thereon to remove the remaining water and cure the adhesive binder.

14. A method of manufacturing a wet laid fibrous laminate according to claim 13 wherein the second layer contains from 25 to 200 grains per square yard of wood pulp and from 50 to 400 grains per square yard of an adhesive binder is applied.

* * * * *